(12) United States Patent
Noggle

(10) Patent No.: US 6,336,776 B1
(45) Date of Patent: Jan. 8, 2002

(54) MILLING CUTTER AND INSERT THEREFOR

(75) Inventor: Kenneth G. Noggle, West Bloomfield, MI (US)

(73) Assignee: Valenite Inc., Madison Hts., MI (US)

( * ) Notice: Subject to any disclaimer, the term of this patent is extended or adjusted under 35 U.S.C. 154(b) by 0 days.

(21) Appl. No.: 09/465,155

(22) Filed: Dec. 16, 1999

(51) Int. Cl.[7] .................... B23C 5/20; B23B 27/16; B23B 27/22
(52) U.S. Cl. .................... 407/34; 407/114; 407/116
(58) Field of Search .................... 407/113–116, 42, 407/34, 51

(56) References Cited

U.S. PATENT DOCUMENTS

| | | | |
|---|---|---|---|
| 3,781,956 A | * 1/1974 | Jones et al. | 407/113 |
| 3,786,541 A | * 1/1974 | Lundgren | 407/116 |
| 3,800,379 A | * 4/1974 | Hopkins | 407/113 |
| 3,815,191 A | * 6/1974 | Holma | 407/114 |
| 3,975,809 A | * 8/1976 | Sorice et al. | 407/114 |
| 4,318,644 A | 3/1982 | Seidel | |
| 4,334,808 A | 6/1982 | Seidel | |
| 4,344,725 A | 8/1982 | Seidel | |
| 4,359,300 A | 11/1982 | Hazra | |
| 4,411,565 A | 10/1983 | Hazra | |
| 4,556,345 A | * 12/1985 | Philippi | 407/114 |
| 5,007,775 A | * 4/1991 | Pantzar | 407/113 |
| 5,067,858 A | * 11/1991 | Cook | 407/114 |
| 5,207,538 A | * 5/1993 | Satran | 407/113 |
| 5,447,396 A | * 9/1995 | Pantzar et al. | 407/113 |
| 5,454,670 A | * 10/1995 | Noda et al. | 407/42 |
| 5,597,271 A | * 1/1997 | Men et al. | 407/113 |

FOREIGN PATENT DOCUMENTS

WO    WO-99/00207 A1 *  1/1999

* cited by examiner

Primary Examiner—William Briggs
Assistant Examiner—Erica E Cadugan
(74) Attorney, Agent, or Firm—John W. Gregg

(57) ABSTRACT

A fully indexable negative geometry polygonal insert uses an active cutting edge extending in a first direction from each corner of the polygon downwardly from an associated major polygonal surface of the insert along with a wiping or finishing cutting edge lying substantially in the plane of the associated major surface and extending in a second direction from the insert corner. The geometry of the cutting edge enables mounting of the insert to a milling cutter with negative axial rake, such that the cutting edge is substantially parallel to an axis of rotation of the cutting tool.

5 Claims, 4 Drawing Sheets

MILLING CUTTER AND INSERT THEREFOR

BACKGROUND OF THE INVENTION

The invention relates generally to indexable cutting inserts and associated material removal tools. More specifically, the invention concerns indexable polygonal inserts for face milling or shallow boring of square or perpendicular shoulders in workpiece material.

Traditionally, to machine a square, or 90° corner, the cutting tool used either employed a helical cutting edge or a neutral linear cutting edge—i.e. an edge exhibiting zero axial rake. However, the neutral cutting edge approach has presented clearance problems in the past with other portions of the cutting insert used with the tool.

Hence, there is seen to be a need in the cutting tool art for providing an indexable insert adaptable for mounting in a cutting tool, such as a face mill or shallow boring bar, which can be oriented to yield an active cutting edge exhibiting zero axial rake, yet capable of providing protection to a trailing cutting edge of the insert.

SUMMARY OF THE INVENTION

Accordingly, in one aspect of the invention, an indexable cutting insert comprises a polygonal body having substantially parallel major surfaces joined by peripheral side surfaces substantially perpendicular to the major surfaces to form corners of the polygon, a main cutting edge extending in a first direction from each corner in a downward direction relative to a major surface associated with the corner, and a wiping edge spaced from the corner in a second direction and lying substantially in the plane of the major surface.

In another aspect of the invention, a rotatable material removal tool has at least one negative geometry insert mounted thereto for forming a shoulder in a workpiece as the tool is rotated, each insert positioned in a pocket of the tool so as to provide negative axial and negative radial rake, but with an active cutting edge of each insert extending in a first direction from a corner of the insert substantially parallel to an axis of rotation of the tool and with a wiping edge extending in a second direction away from the corner of the insert, whereby a substantially 90° shoulder is formed in a workpiece subjected to the rotating tool's cutting action.

BRIEF DESCRIPTION OF THE DRAWING

The objects and features of the invention will become apparent in view of a detailed description of a preferred embodiment, taken in conjunction with the drawing, in which.

DETAILED DESCRIPTION

Figure 1:
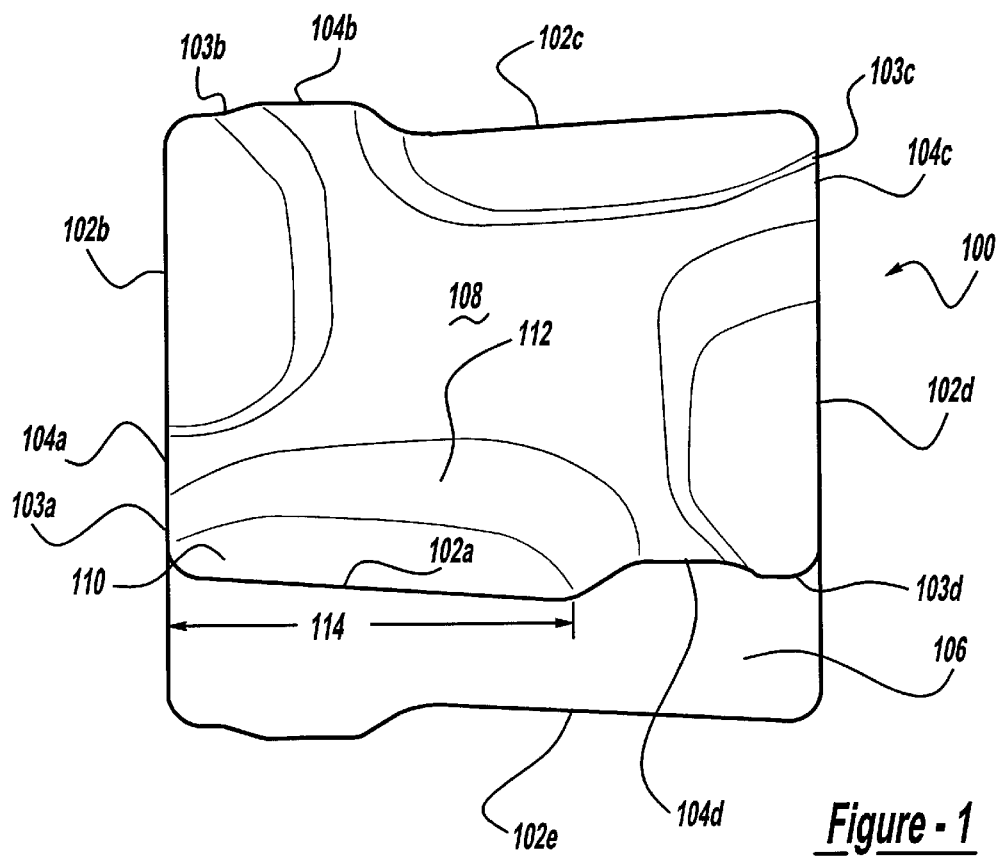
FIG. 1 is a perspective view of a fully indexable negative insert arranged in accordance with the principles of the invention.

With reference to FIG. 1, insert 100 has a "negative" form—i.e. active cutting edges around its periphery on both major surfaces, due to the fact that the flank surfaces are substantially perpendicular to both major surfaces. A principal advantage of negative inserts is that they provide twice as many indexable cutting edges as provided by one-sided, or positive form, inserts.

Each main cutting edge of insert 100, 102a–d associated with major surface 108 and 102e–h (edges 102f,g, and h not visible in the view of FIG. 1) extend from an associated corner of the insert in a direction which proceeds downwardly from the associated major surface, such as 108.

When mounted to a face mill in accordance with the principles of the invention to be discussed below, each active cutting edge such as 102a will provide a depth of cut as shown at 114 in FIG. 1. Each cutting edge 102a–h exhibits a positive form (i.e. the top surface behind each cutting edge forms an acute angle with the associated side or flank surface of the insert) through use of a groove formed by a first surface 110 which extends downwardly from cutting edge 102a to join a bottom-most portion of an upwardly rising ramp surface 112 which terminates substantially in the plane of major surface 108.

Additionally associated with each main cutting edge 102a–h is a respective finishing or wiping edge 104a–h (104e, f, g, and h, not shown in FIG. 1). Each wiping edge 104a–h lies substantially in the plane of its associated major surface. For example, wiping edges 104a, b, c and d lie substantially in the plane of their associated major surface 108. Connecting each cutting edge 102 with its associated finishing edge 114 is a transitional cutting edge 103a–h, which basically functions as a chip forming element.

The insert additionally comprises a second major surface not shown in the drawing of FIG. 1 but which is substantially parallel to major surface 108. The two major surfaces are joined by four side or flank surfaces 106 (only one of the flank surfaces being visible in the perspective view of FIG. 1). It will be understood that the flank surfaces 106 are substantially normal or perpendicular to the major surfaces 108 to form a polygon, such as the square insert shown in FIG. 1. It will be understood that the insert of this invention could comprise a polygon of virtually any shape. However, the square shape with the cutting edge and its associated wiping edge extending at substantially 90° angles to each other from a respective corner of the insert is preferred in forming a 90° shoulder in a workpiece.

Figure 2:
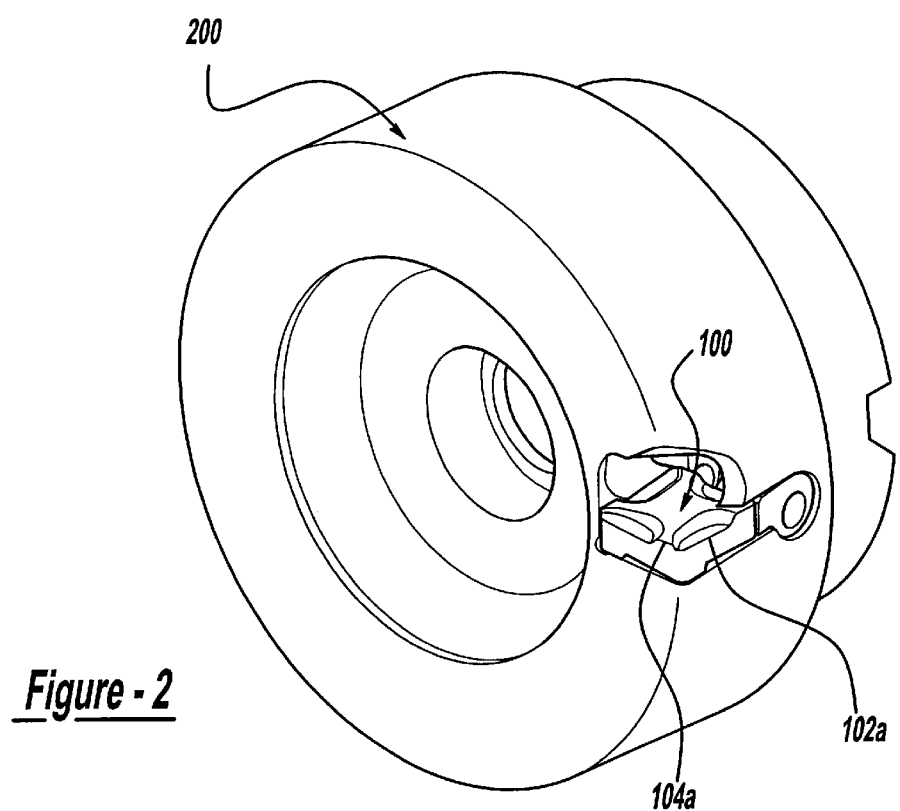
FIG. 2 is a perspective view of a face mill mounting at least one of the inserts of the FIG. 1 thereto.

With each main cutting edge 102 extending downwardly from its associated corner as shown in FIG. 1, the insert may be advantageously mounted to a cutting tool such as a rotating face mill 200 of FIG. 2 in a manner such that the cutting edge may be parallel to the axis of rotation of the tool, even though the insert itself is mounted in a pocket to exhibit an overall negative axial rake.

Figure 3:
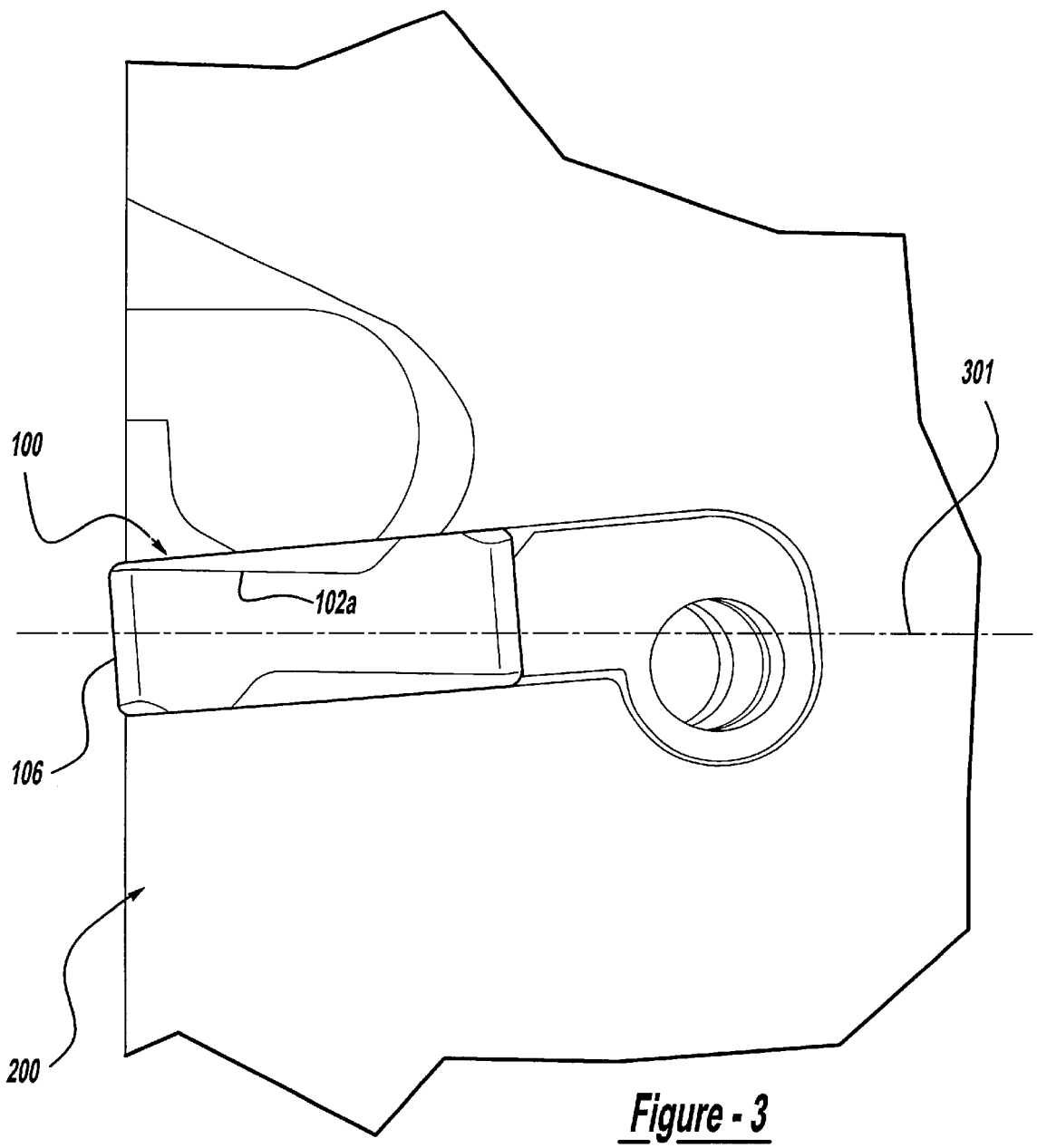
FIG. 3 is a side view of the milling cutter body 200 of FIG. 2.

The view of FIG. 3 demonstrates the principle of negative axial overall rake, yet neutral rake of the cutting edge 102a with respect to an axis of rotation 301 of a face milling cutter 200. Note from FIG. 3 that cutting edge 102a lies substantially parallel to the axis of rotation 301 of cutter 200, thereby providing effective neutral axial rake cutting action, while the negative axial positioning of the insert body provides necessary clearance between flank surface 106 and the workpiece material being milled.

Figure 4:
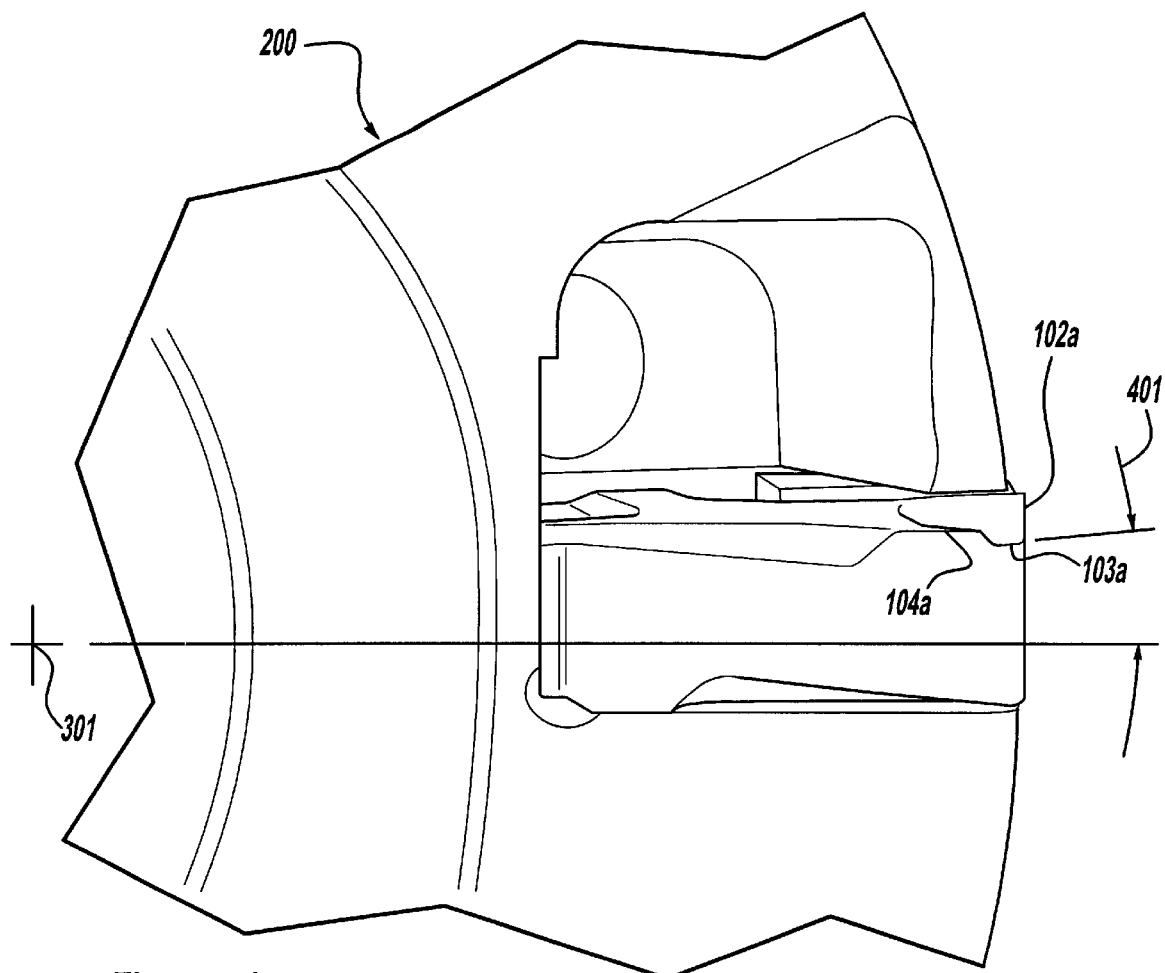
FIG. 4 is an end view of the milling cutter 200 of FIG. 2.

In addition to negative axial rake of the overall insert in a mounting pocket of the face mill 200, the invention utilizes negative radial rake for the overall insert as seen in the end view of FIG. 4 of milling cutter 200 where the insert 100 is mounted to the milling cutter in a manner exhibiting negative radial rake (i.e. where the active cutting edge lies ahead of center) as shown at the angle 401 of FIG. 4.

While the overall insert body is thus mounted in a cutter body pocket with negative axial and radial rake angles to provide clearance, it is a feature of this invention that the actual effective cutting edge radial rake angle may be negative, neutral or positive. The choice of cutting edge radial rake geometry depends upon the amount of required cutting edge strength, which, in turn, is a function of the type of material being machined.

It will be understood by those skilled in the art that the insert 100 of the invention may also be advantageously mounted in a shallow boring bar as well as in the face mill of FIGS. 2–5.

Figure 5A:
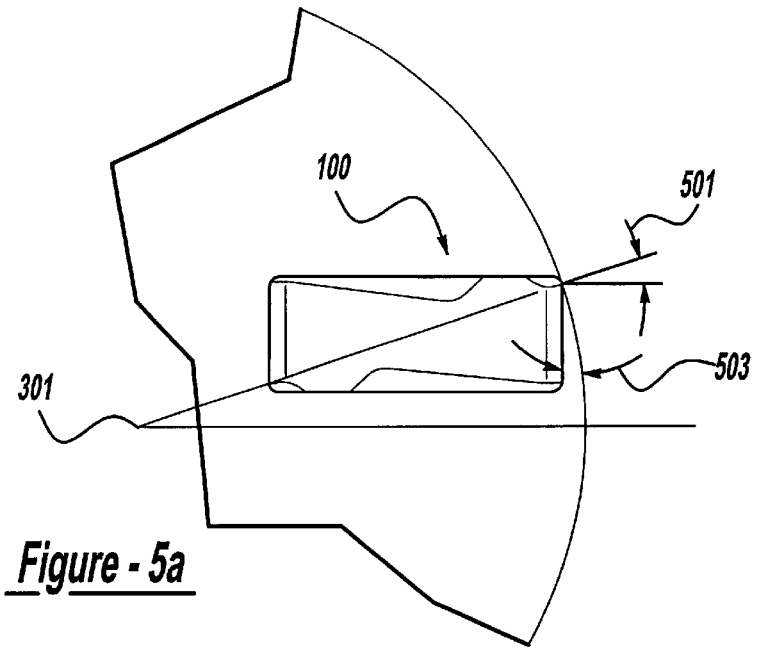
FIG. 5a is another end view of milling cutter 200 showing negative radial rake.

FIG. 5a is another end view of milling cutter 200 demonstrating a negative radial rake angle 501 and the resulting clearance angle 503 which will protect the trailing edge of the insert as the tool rotates through the workpiece material.

Figure 5B:
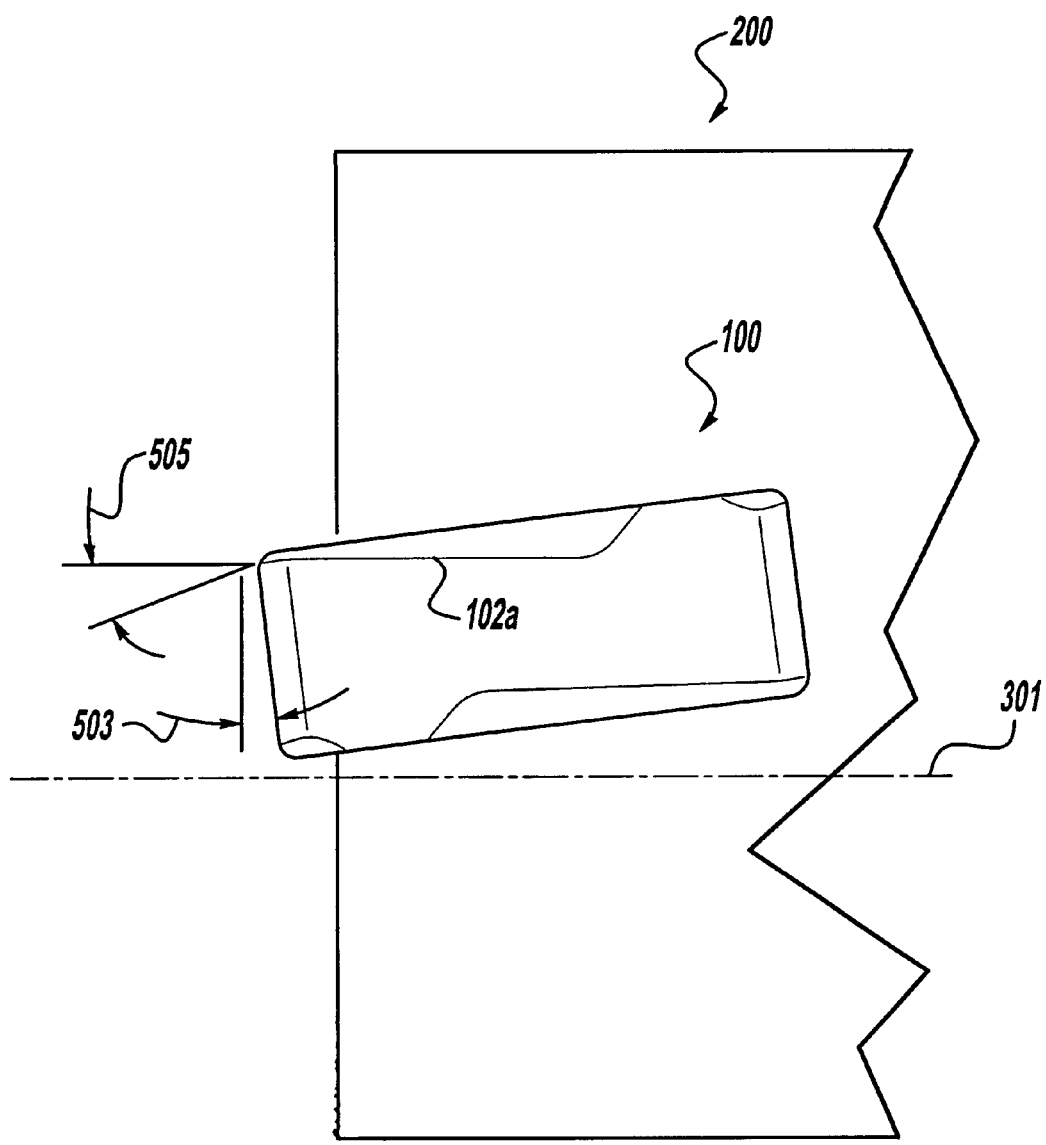
FIG. 5b is another side view of milling cutter 200 demonstrating negative axial rake.

Finally, FIG. 5b is another side view of milling cutter 200 depicting the negative axial rake 505 and the resulting clearance angle 503 provided by this mounting arrangement.

Hence, using the principles of the invention, a negative insert (that having formed cutting edges on both sides thereof to provide maximum indexability) is raked in the cutter body such that a high point on the insert extends beyond the rest of the insert creating clearance or protection for the trailing cutting edge of each insert 100.

Additionally, the high point of the insert is formed to create a wiping edge associated with main cutting edge to produce a good part finish and, in the case of a polygonal insert having substantially 90° corners to finish off an ideal 90° shoulder in a workpiece.

The design allows for an insert to be double-sided with a built-in wiper edge and will produce a square shoulder on the finished part while protecting the trailing cutting edge of the inserts employed.

The invention also enables the insert pockets to be more easily machined into the cutter body relative to compounding angles. The top form of the cutting edges with the associated depressions inwardly of each edge allows the cutting geometry to be neutral to positive.

The invention has been described with reference to a preferred embodiment for the sake of example only. The scope and spirit of the invention are to be determined from a proper interpretation of the appended claims.

I claim:

1. An indexable cutting insert, the insert having two substantially parallel major surfaces of polygonal shape defining corners of the insert and joined by peripheral side surfaces substantially perpendicular to the major surfaces, the insert comprising main cutting edges and associated wiping edges, one main cutting edge and an associated wiping edge being arranged adjacent to each corner of a major surface, each wiping edge lying substantially in the plane of a major surface and spaced from a corner of that major surface, each main cutting edge defined by a groove in a respective one of the major surfaces, which groove is open to one of the side surfaces, each main cutting edge extending from one of the corners of the insert in a first direction and also extending downward relative to the respective major surface, and the associated wiping edge leading away from that corner in a second direction.

2. The cutting insert of claim 1, wherein each groove is formed by a first surface extending downwardly from the main cutting edge defined thereby to provide a positive rake cutting form and by an upwardly rising ramp surface joining the first surface and terminating in the respective major surface.

3. The cutting insert of claim 1, wherein the polygonal shape of the major surfaces defines substantially square corners.

4. The cutting insert of claim 1 further comprising a transitional cutting edge coupling each main cutting edge to its associated wiping edge.

5. A rotatable material removal tool rotatable about an axis and having at least one insert mounted thereto for forming a shoulder in a workpiece as the tool is rotated, the at least one insert having two substantially parallel major surfaces of polygonal shape defining corners of the at least one insert and joined by peripheral side surfaces substantially perpendicular to the major surfaces, the at least one insert comprising main cutting edges and associated wiping edges, one main cutting edge and an associated wiping edge being arranged adjacent to each corner of a major surface, each wiping edge lying substantially in the plane of a major surface and spaced from a corner of that major surface, each main cutting edge defined by a groove in a respective one of the major surfaces, which groove is open to one of the side surfaces, each main cutting edge extending from one of the corners of the at least one insert in a first direction and also extending downward relative to the respective major surface, and the associated wiping edge leading away from that corner in a second direction, wherein the polygonal shape of the major surfaces defines substantially square corners, each insert positioned in a pocket of the tool with overall negative axial and negative radial rake, but with an active main cutting edge of each insert extending in a first direction substantially parallel to the axis of rotation of the tool, whereby a substantially square shoulder is formed in a workpiece subjected to the cutting action of the rotatable material removal tool.

* * * * *